(12) United States Patent
Taguchi

(10) Patent No.: US 12,061,598 B2
(45) Date of Patent: Aug. 13, 2024

(54) FILE MANAGEMENT APPARATUS AND NON-TRANSITORY COMPUTER READABLE MEDIUM

(71) Applicant: FUJIFILM Business Innovation Corp., Tokyo (JP)

(72) Inventor: Ryouji Taguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 418 days.

(21) Appl. No.: 17/326,361

(22) Filed: May 21, 2021

(65) Prior Publication Data

US 2022/0107939 A1    Apr. 7, 2022

(30) Foreign Application Priority Data

Oct. 2, 2020    (JP) .................. 2020-167460

(51) Int. Cl.
*G06F 16/23*    (2019.01)
*G06F 3/0482*    (2013.01)
(Continued)

(52) U.S. Cl.
CPC ........ *G06F 16/2379* (2019.01); *G06F 3/0482* (2013.01); *G06F 16/245* (2019.01); *G06F 16/252* (2019.01)

(58) Field of Classification Search
None
See application file for complete search history.

(56) References Cited

U.S. PATENT DOCUMENTS 9,262,417 B2    2/2016    Matsumoto
2006/0136438 A1*    6/2006    McChrystal ............ G06F 16/93

(Continued)

FOREIGN PATENT DOCUMENTS

JP    5889009    3/2016
JP    2019086864    6/2019

OTHER PUBLICATIONS

A. W. Hotan; PSRCHIVE and PSRFITS: An Open Approach to Radio Pulsar Data Storage and Analysis; Cambridge University; 2004; pp. 302-309.*

*Primary Examiner* — Albert M Phillips, III
*Assistant Examiner* — Jermaine A Mincey
(74) *Attorney, Agent, or Firm* — JCIPRNET

(57) ABSTRACT

A file management apparatus includes a processor configured to: in a case where (i) multiple content files for a specific purpose are managed, (ii) pieces of configuration information each indicating a position of a content file are defined in advance, and (iii) when a content file is registered, the content file is associated with a piece of configuration information indicating the position of the content file, accept a retrieval request to collectively retrieve multiple registered content files each already associated with a piece of configuration information; for each of the multiple registered content files, based on the retrieval request, after adding to a filename of the registered content file a piece of configuration information with which the registered content file has been associated, provide an archive file containing the multiple registered content files placed at a single level of hierarchy; and for each of the pieces of configuration information including a piece of configuration information with which a content file has yet to be associated, create a configuration information file having a filename to which the piece of configuration information is added and include in the archive file the configuration information file in addition to the multiple registered content files.

20 Claims, 12 Drawing Sheets

(51) Int. Cl.
*G06F 16/245* (2019.01)
*G06F 16/25* (2019.01)

(56) References Cited

U.S. PATENT DOCUMENTS

2019/0129583 A1 5/2019 Yamada et al.
2021/0174011 A1* 6/2021 Harada .................. G06F 16/93

* cited by examiner

FIG. 3
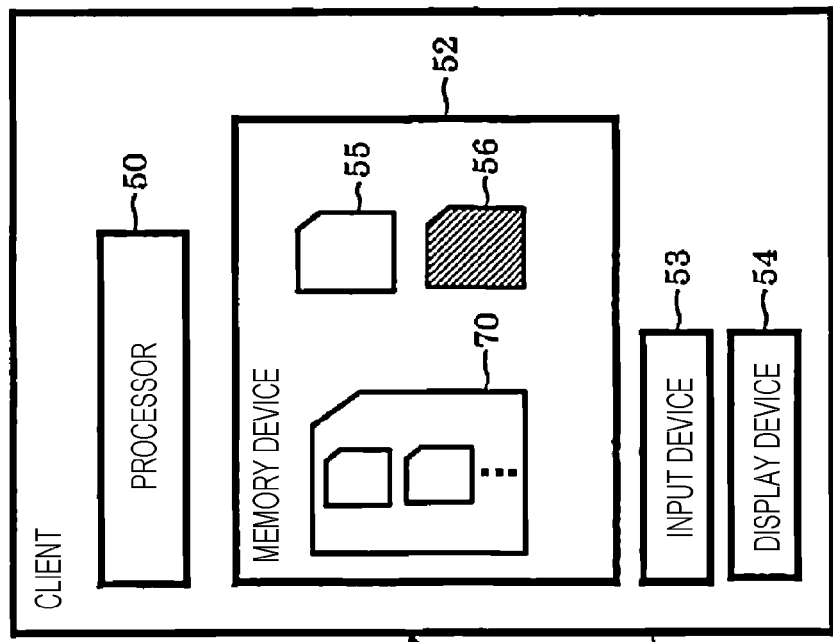
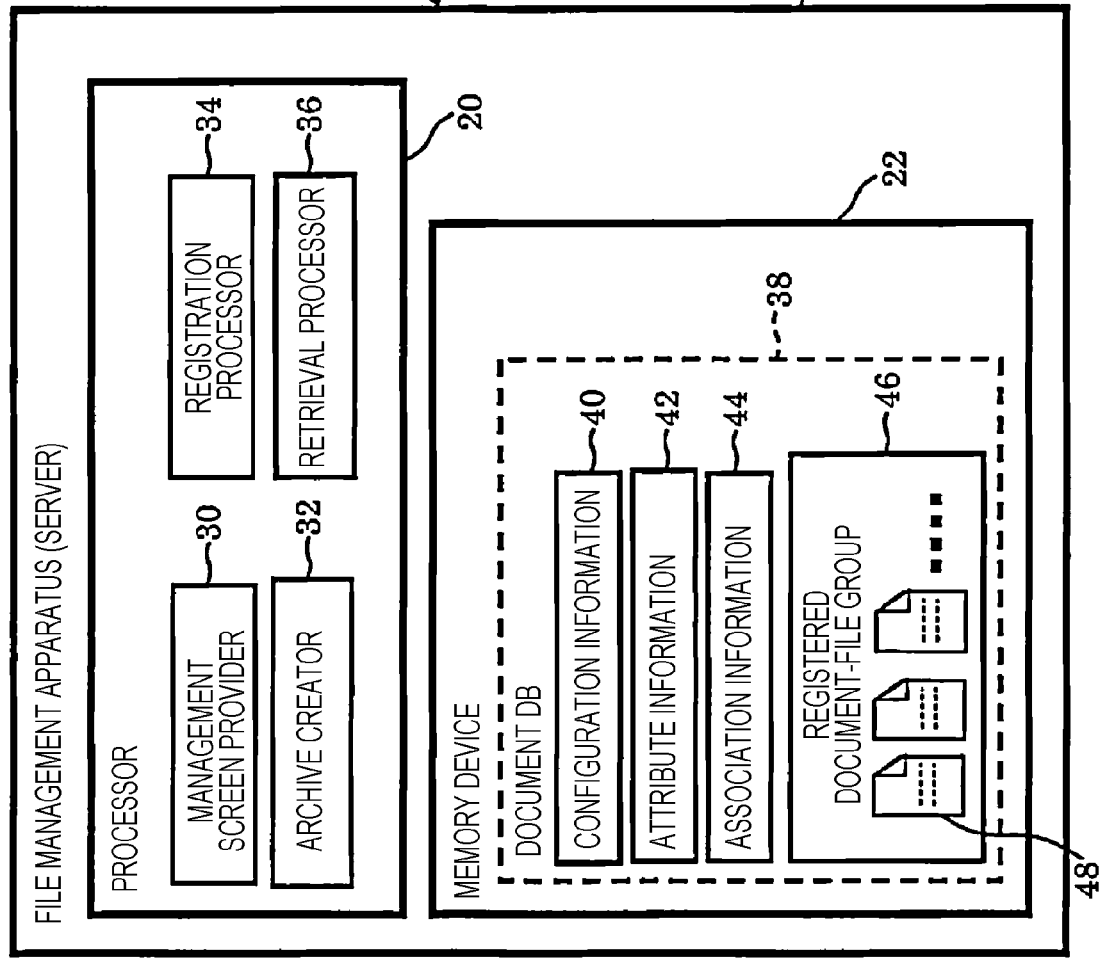

FILE MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-167460 filed Oct. 2, 2020.

BACKGROUND

(i) Technical Field

The present disclosure relates to a file management apparatus and a non-transitory computer readable medium.

(ii) Related Art

There are known techniques by which to collectively retrieve as an archive file a plurality of electronic files stored in a storage device of a computer.

Japanese Patent No. 5889009 describes a technique by which to collectively download a plurality of content documents as an archive file, and if content documents having the same name are stored at different locations in a server, this technique allows the content documents to be stored in different folders in the archive file, thereby preventing the content documents having the same name from appearing in the same folder at a download destination.

Japanese Unexamined Patent Application Publication No. 2019-86864 describes a method of copying a document file, by which a document file is copied and the filename of the document file at a copy destination includes path information indicating the copy source location where the document file is stored (refer to paragraph [0080] and FIG. 13 in Japanese Unexamined Patent Application Publication No. 2019-86864).

SUMMARY

In some methods of managing a plurality of electronic files (hereinafter, referred to as content files) for a certain purpose, a folder is provided in advance to store each of the plurality of content files, and each content file is stored and managed in a corresponding folder. Further, in some databases or the like for managing a plurality of content files for a certain purpose, each of the plurality of content files is categorized in advance based on the role or the like of the content file, and each content file is associated with a corresponding category and managed when the content file is registered. For these types of file management, the storage location or the category for a content file indicates the position of the content file. Hereinafter, these types of file management are each referred to as a predefined file-positioning type of file management or a predefinition type of file management.

When a plurality of content files for a specific purpose are managed by using a predefinition type of file management and content files each already associated with a position are collectively retrieved as an archive file, it is hoped that a position with which a content file has yet to be associated is determined by using the result of retrieving the content files.

Aspects of non-limiting embodiments of the present disclosure relate to a predefinition type of file management to manage a plurality of content files for a specific purpose and relate to using the result of retrieving content files each already associated with a position and enabling the determination of a position with which a content file has yet to be associated.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a file management apparatus including a processor configured to: in a case where (i) a plurality of content files for a specific purpose are managed, (ii) pieces of configuration information each indicating a position of a content file are defined in advance, and (iii) when a content file is registered, the content file is associated with a piece of configuration information indicating the position of the content file; accept a retrieval request to collectively retrieve a plurality of registered content files each already associated with a piece of configuration information; for each of the plurality of registered content files, based on the retrieval request, after adding to a filename of the registered content file a piece of configuration information with which the registered content file has been associated, provide an archive file containing the plurality of registered content files placed at a single level of hierarchy; and for each of the pieces of configuration information including a piece of configuration information with which a content file has yet to be associated, create a configuration information file having a filename to which the piece of configuration information is added and include in the archive file the configuration information file in addition to the plurality of registered content files.

BRIEF DESCRIPTION OF THE DRAWINGS

An exemplary embodiment of the present disclosure will be described in detail based on the following figures, wherein:

FIG. 3 is a functional block diagram of the file management system;

DETAILED DESCRIPTION

Figure 1:
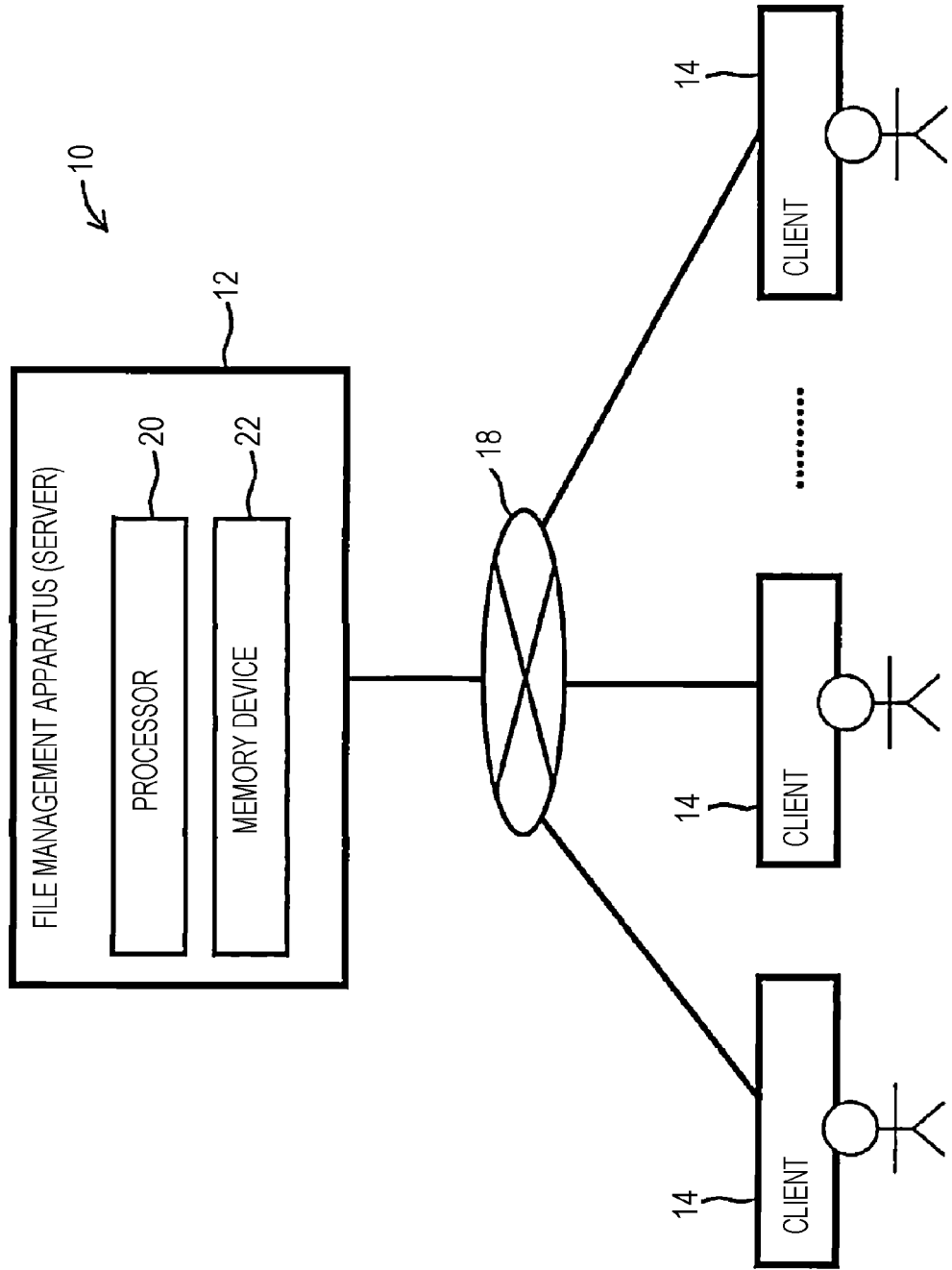
FIG. 1 is an illustration of a schematic configuration of a file management system.

Hereinafter, an exemplary embodiment according to the present disclosure will be described in detail with reference to the accompanying drawings. The configuration described below is an example for illustration and can appropriately be modified in accordance with a condition such as specifications of a system and an apparatus. If a plurality of exemplary embodiments, modifications, and the like are included in the following description, it is assumed from the beginning that each feature described below is appropriately combined with other features. The same or similar elements are denoted by the same reference numerals or symbols in all the figures and are not repeatedly described.

Schematic Configuration of File Management System

FIG. 1 is an illustration of a schematic configuration of a file management system 10. The file management system 10 includes a server 12 and a plurality of clients 14 communicatively connected to the server 12 via a network 18 such as the Internet. The network 18 is not limited to the Internet, and examples of the network 18 include various types of networks, such as an intranet and a dedicated line. The server 12 functions as a file management apparatus 12. Hereinafter, the server 12 is referred to as the file management apparatus 12.

The file management apparatus 12 is a computer that manages a plurality of content files. In response to a request from a client 14, the file management apparatus 12 accepts registration of a content file and provides a registered content file to the client 14. Content files are electronic files of various types, including image files and document files. In the following description, a content file is assumed to be a document file. A "content file" refers to an electronic file to be managed by the file management apparatus 12 and is distinguished from an "archive file" and a "configuration information file", which are created based on a retrieval request to retrieve a content file (described in detail below).

The file management apparatus 12 includes a processor 20 and a memory device 22. The processor 20 includes a central processing unit (CPU) and executes information processing in accordance with a program installed on the file management apparatus 12. The processor 20 may be defined as a computer in a narrow sense. The memory device 22 is formed by a read-only memory (ROM), a random-access memory (RAM), a flash memory, a hard disk, and the like and stores programs, which are executed by the processor 20, and other data. The file management apparatus 12 functions as a web server.

The programs executed by the processor 20 of the file management apparatus 12 may be provided not only via a network, such as the Internet, but also in a stored form of a computer readable recording medium, such as an optical disc or a universal-serial-bus (USB) memory.

The client 14 is a device such as a personal computer (PC), a tablet terminal, or a smartphone, which is operated by a user. A web browser is installed on the client 14. The user causes the web browser to present on the display of the client 14 a screen (including a window) provided by the file management apparatus 12 and performs operations on the screen. Instead of the web browser, a dedicated application may be used on the client 14.

Predefinition Type of File Management

Figure 2:
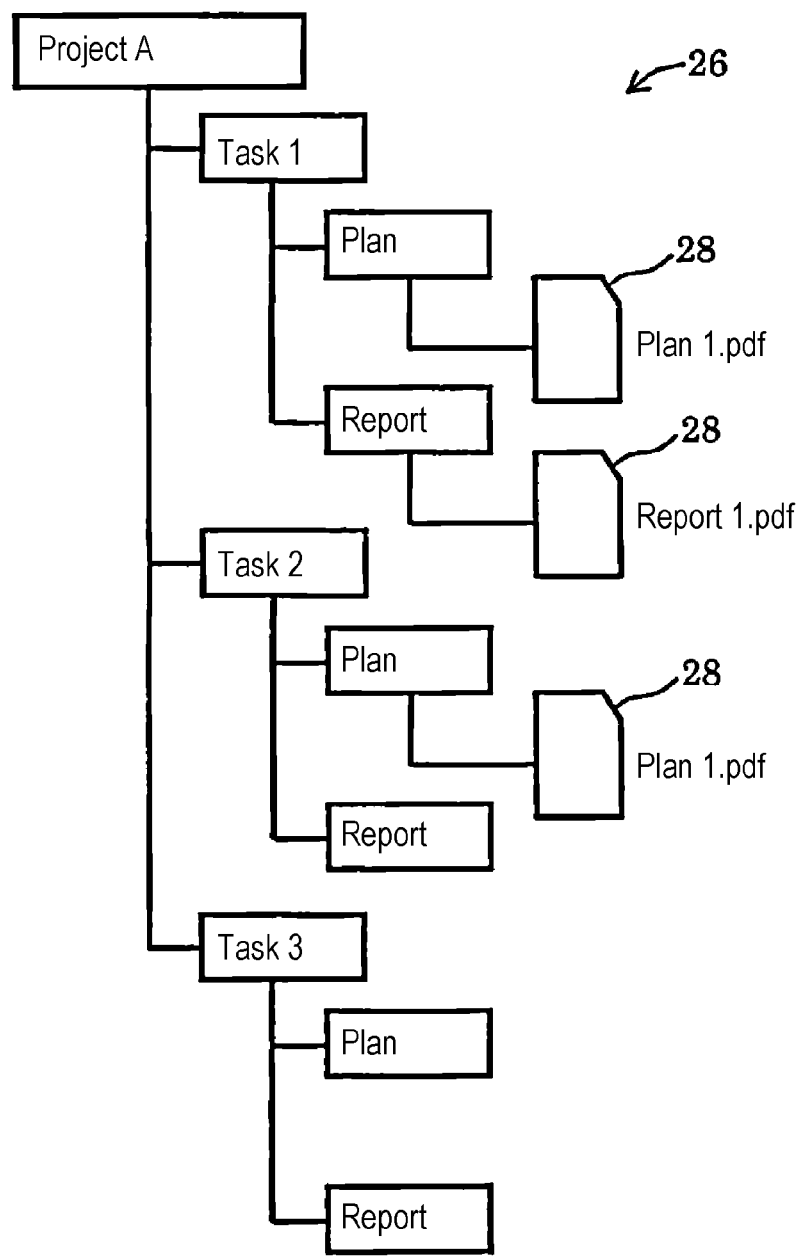
FIG. 2 is a diagram for describing a predefinition type of file management.

A predefinition type of file management, which is performed by the file management apparatus 12, will be described. The file management apparatus 12 manages a plurality of document files 28 for a case such as is depicted, for example, in FIG. 2 ("Project A" in FIG. 2). A case is a job including a plurality of processes (including a business process). FIG. 2 depicts a document-file management example 26. In the document-file management example 26, a case "Project A" includes processes "Task 1", "Task 2", and "Task 3", and a "Plan" and a "Report" are required for each process. In FIG. 2, files "Plan 1.pdf" and "Report 1.pdf" and another file "Plan 1.pdf" are registered document files 28.

First, before the document files 28 are registered (for example, at a scheduling stage of a case), the user provides the file management apparatus 12 with the specification of the types of documents to be registered in the file management apparatus 12 for the case, namely the types of documents to be managed by the file management apparatus 12. In the example in FIG. 2, the user specifies that a document "Plan" and a document "Report" are to be registered for each of the processes "Task 1", "Task 2", and "Task 3" for the case "Project A".

Then, the file management apparatus 12 creates a folder in which to store a document file of a specified document. The file management apparatus 12 creates folders in a hierarchical structure, such as an upper folder for the case, intermediate folders for the processes included in the case, lower folders for the documents each included in one of the processes as depicted in FIG. 2. In FIG. 2, the case name, the process names, and the document names, which are enclosed by rectangles, each indicate a folder to which the name is assigned. A storage location (folder) created in this way for each document file may be referred to as the position of the document file. This type of file management, in which the positions of the document files 28 are specified (in other words, "storage locations are provided") before the document files 28 are registered, is referred to as a predefinition type of file management. A document file 28 (for example, a document file "Plan 1.pdf" in FIG. 2) is stored by using the client 14 in the folder corresponding to the document file 28 (for example, "Project A"-"Task 1"-"Plan" in FIG. 2), and thereby the document file 28 is registered.

As depicted in FIG. 2, the path name of a folder indicates the storage location of a document file (for example, "Project A"-"Task 1"-"Plan" in FIG. 2) and represents a category such as a role of the document file (for example, "Plan 1.pdf" in FIG. 2). In this way, providing the storage location (folder) of a document file in advance is equivalent to defining the category for the document file in advance. The category for a document file may also be referred to as the position of the document file. In the example in FIG. 2, the position of a document file is defined with respect to both the storage location and the category for the document file. Depending on a way to name a folder, it is possible that the path name of a folder does not represent the category for a document file. Even in that case, the position of the document file is defined with respect to the storage location of the document file (namely, the storage location has been provided).

In the above description, it is assumed that a document file is managed by using a folder, but a database may be used to manage a document file. It is assumed in the above description that the case name, the process names, and the document names, which are enclosed by rectangles in FIG. 2, each represent a folder. In the following description, it is assumed that those names are each an element representing the category for a document file. When a database is used to manage document files, specification of the types of documents to be registered in the file management apparatus 12 is accepted from the user before document files are registered, and the database is used to define the category (position) for a document. In the example in FIG. 2, categories are defined in a hierarchical structure, such as an upper element for the case, intermediate elements for the processes included in the case, lower elements for the documents each included in one of the processes. In FIG. 2, for example, "Project A"-"Task 1"-"Plan", "Project A"-"Task 1"-"Report", and the like each represent a category. A document file 28 (for example, a document file "Plan 1.pdf" in FIG. 2) is associated with the category corresponding to the document file 28 (for example, "Project A"-"Task 1"-"Plan" in FIG. 2) by using the database, and thereby the document file 28 is registered. This is an example of a predefinition type of file management using a database.

A predefinition type of file management may be achieved by using folders, a database, or a method similar to these methods. As described below, a database is used as an example in the present exemplary embodiment.

Information indicating the position of each content file (a document file in this example) is referred to as configuration information. In FIG. 2, for example, "Project A"-"Task 1"-"Plan", "Project A"-"Task 1"-"Report", and the like each represent a piece of configuration information. A piece of configuration information may be defined in a hierarchical manner by using configuration elements. Specifically, when a piece of configuration information is defined in a hierarchical manner, each level of the hierarchy represents a configuration element of the piece of configuration information. In FIG. 2, the case (Project A) represents a configuration element at an upper level, a process (for example, Task 1) represents a configuration element at an intermediate level, and a document (for example, a plan) required in a process represents a configuration element at a lower level. The configuration element at the uppermost level (the case "Project A" in FIG. 2), which represents the root element, indicates the purpose of all the document files to be managed and is included in all the pieces of configuration information. Thus, the configuration element at the uppermost level does not have a capability of discriminating between pieces of configuration information and may be removed from each piece of configuration information. In the following description, a piece of configuration information is assumed to have a form from which the configuration element at the uppermost level, which indicates the purpose of all the document files to be managed, is removed.

In the example depicted above, although it is assumed that content files related to the case are managed, content files to be managed by a predefinition type of file management are not limited to content files related to the case.

Features of File Management Apparatus

The file management apparatus 12 manages a plurality of document files for a specific purpose by using a predefinition type of file management. The processor 20 of the file management apparatus 12 accepts from the client 14 a retrieval request to collectively retrieve registered document files each already associated with a piece of configuration information. A registered document file already associated with a piece of configuration information indicates either a document file that has been stored in a folder as a storage location (position) at the time of registration or a document file that has been associated with a category (position) by using a database or the like at the time of registration.

Figure 6:
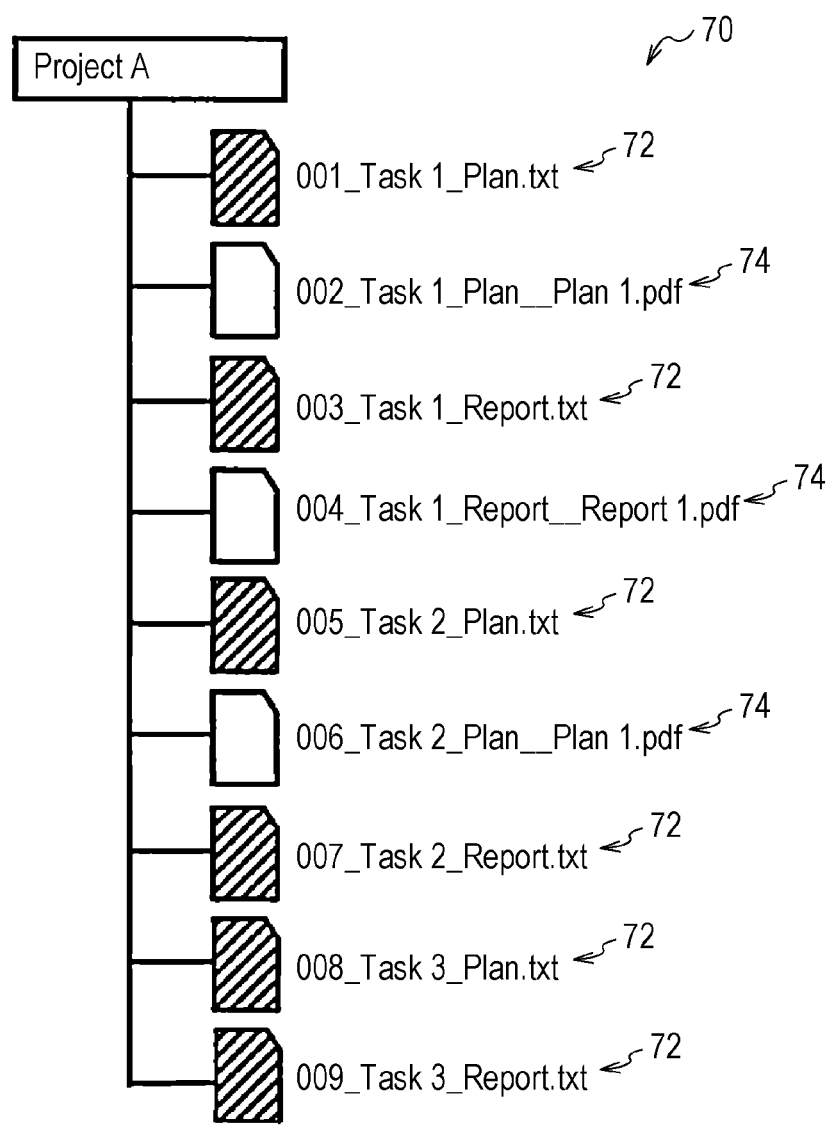
FIG. 6 is an illustration depicting an example configuration of an archive file.

Then, as depicted in FIG. 6, in response to the accepted retrieval request, the processor 20 of the file management apparatus 12 provides an archive file 70 to the client 14. The archive file 70 contains a plurality of registered document files 74 placed at a single level of hierarchy, and a piece of configuration information of each of the registered document files 74 has been added to the filename of the registered document file 74. In FIG. 6, the content of the archive file 70, which corresponds to the document-file management example 26 in FIG. 2, is depicted. When providing the archive file 70, the processor 20 of the file management apparatus 12 creates a configuration information file 72 for each piece of configuration information including a piece of configuration information with which a document file has yet to be associated. Each configuration information file 72 has a filename to which a piece of configuration information is added, and the processor 20 of the file management apparatus 12 includes each configuration information file 72 in the archive file 70. The way to express a piece of configuration information contained in a filename need not exactly be the same as the way to express a piece of configuration information 40 (described below) stored in a document database 38. The expression may be modified as long as the user of the client 14, who looks at a filename containing a piece of configuration information, can determine the position.

In this way, a position (piece of configuration information) with which a document file 74 has not been associated, namely a position (piece of configuration information) at which a document file 74 has not been registered, is grasped based on the content of the archive file 70 by using the client 14. Specifically, if there is a combination of a document file 74 and a configuration information file 72, both of which have filenames having the same piece of configuration information, the document file 74 has been registered and associated with the piece of configuration information. If there is no combination and only a configuration information file 72 is present, a document file has not been registered and has not been associated with the piece of configuration information corresponding to the configuration information file 72.

Functional Configuration of File Management System

The file management system 10 according to the present exemplary embodiment will specifically be described herein. FIG. 3 is a functional block diagram of the file management system 10 according to the present exemplary embodiment. The processor 20 of the file management apparatus 12 operates in accordance with a program (not illustrated) stored in the memory device 22 and thus functions as a management screen provider 30, an archive creator 32, a registration processor 34, and a retrieval processor 36. The management screen provider 30 provides a management screen (refer to FIG. 4) to the client 14. The archive creator 32 performs processing of creating an archive file 70 and providing the archive file 70 to the client 14. The registration processor 34 performs processing of registering a document file in the document database 38. The retrieval processor 36 performs processing of retrieving an individual document file from the document database 38 and providing the document file to the client 14.

The document database 38 (hereinafter, referred to as the document DB 38) is stored in the memory device 22 of the file management apparatus 12. The document DB 38 contains configuration information 40, attribute information 42, association information 44, and a registered document-file group 46.

The configuration information 40 in the document DB 38 has been described by using FIG. 2. In the following description, it is also assumed that the configuration information 40 in the document DB 38 corresponds to the document-file management example 26 in FIG. 2. The attribute information 42 in the document DB 38 contains a piece of attribute information 42, which is related to each piece of configuration information 40, specified by the user when the piece of configuration information 40 is defined. Examples of a piece of attribute information 42 includes a scheduled date for starting creation, a person in charge of creation, and a completion date of a document (position). The registered document-file group 46 in the document DB 38 is a group of document files 48 (referred to as registered document files). A document file is registered in the document DB 38 as a document file 48 by using the client 14. A piece of association information 44 in the document DB 38 is created when a document file is registered and associated with a piece of configuration information by using the client 14. A piece of association information 44 indicates which piece of configuration information the document file is associated with. The document file is to become a member of the registered document-file group 46.

The client 14 includes a processor 50, a memory device 52, an input device 53, and a display device 54. The processor 50 of the client 14 includes a CPU and operates in accordance with a program (not illustrated) stored in the memory device 52. The memory device 52 of the client 14 is formed by a ROM, a RAM, a flash memory, a hard disk, and the like. The memory device 52 stores programs (not illustrated), the archive file 70 retrieved from the file management apparatus 12, document files 55 individually retrieved from the file management apparatus 12, and document files 56 to be registered in the file management apparatus 12. The input device 53 is formed by devices such as a keyboard and a mouse. The display device 54 is formed by a display.

Management Screen

Figure 4:
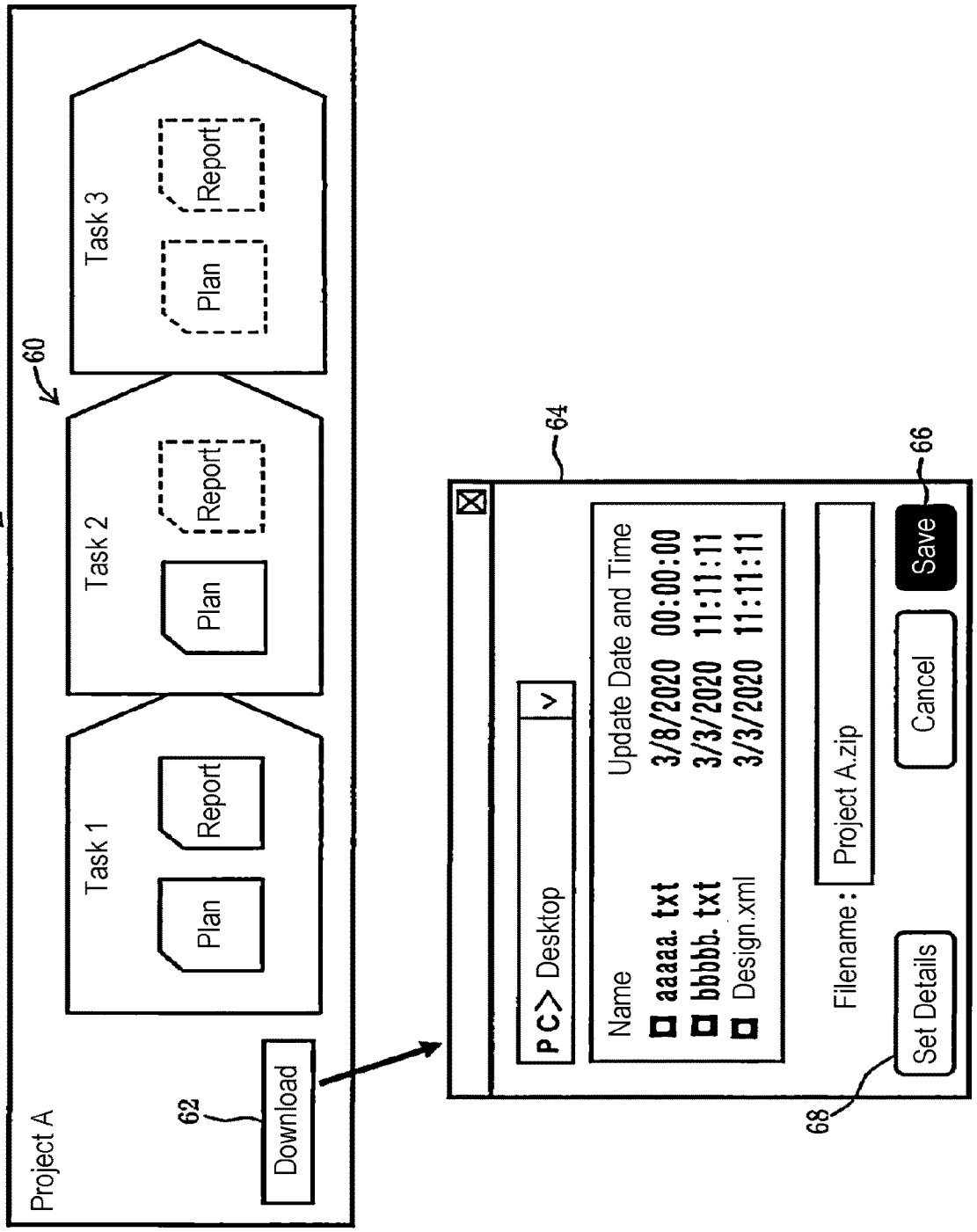
FIG. 4 is an illustration depicting examples of a management screen and a storage-location specifying window for an archive file.

Next, a management screen provided by the file managing apparatus 12 will be described. The upper part of FIG. 4 depicts an example of a management screen 58. The management screen 58 corresponds to the document-file management example 26 in FIG. 2. The management screen 58 includes a managed-document display section 60 and a "Download" button 62, and the managed-document display section 60 presents documents managed by using the document DB 38.

The user uses an application such as a web browser and sends from the client 14 to the file management apparatus 12 a request for presenting the management screen 58. In response to the request, the management screen provider 30 of the file management apparatus 12 creates the management screen 58. The file management apparatus 12 provides the client 14 with the management screen 58, which has been created, and the management screen 58 is presented by the display device 54 of the client 14. The management screen provider 30 creates the managed-document display section 60 of the management screen 58 in accordance with the configuration information 40 and the association information 44 in the document DB 38. A piece of configuration information with which a document file is associated is determined based on the association information 44 in the document DB 38, and a piece of configuration information with which a document file has yet to be associated (a document file has yet to be registered) is determined based on the comparison between the association information 44 in the document DB 38 and the configuration information 40 (all the pieces of configuration information) in the document DB 38. Accordingly, the management screen provider 30 is able to create the managed-document display section 60 so as to distinguish between a document whose document file has already been associated (has already been registered) and a document whose document file has yet to be associated (has yet to be registered), as depicted in the managed-document display section 60 in FIG. 4. In the managed-document display section 60 in FIG. 4, a registered document is enclosed by a solid line, and a document not yet registered is enclosed by a dashed line.

The "Download" button 62 in the management screen 58 is used to collectively retrieve as an archive file document files registered in the document DB 38. The user operates the input device 53 of the client 14 and presses the "Download" button 62, for example, by using a mouse cursor. Then, the file management apparatus 12 provides the client 14 with a storage-location specifying window 64 (the lower part of FIG. 4), which is then presented by the display device 54 of the client 14. When the user specifies the storage location of an archive file in the memory device 52 of the client 14 and the filename of the archive file ("Project A.zip" in the example in FIG. 4) by using the storage-location specifying window 64 and presses a "Save" button 66, a collective-retrieval request to collectively retrieve registered document files is sent to the file management apparatus 12.

Creation of Archive File

Figure 5:
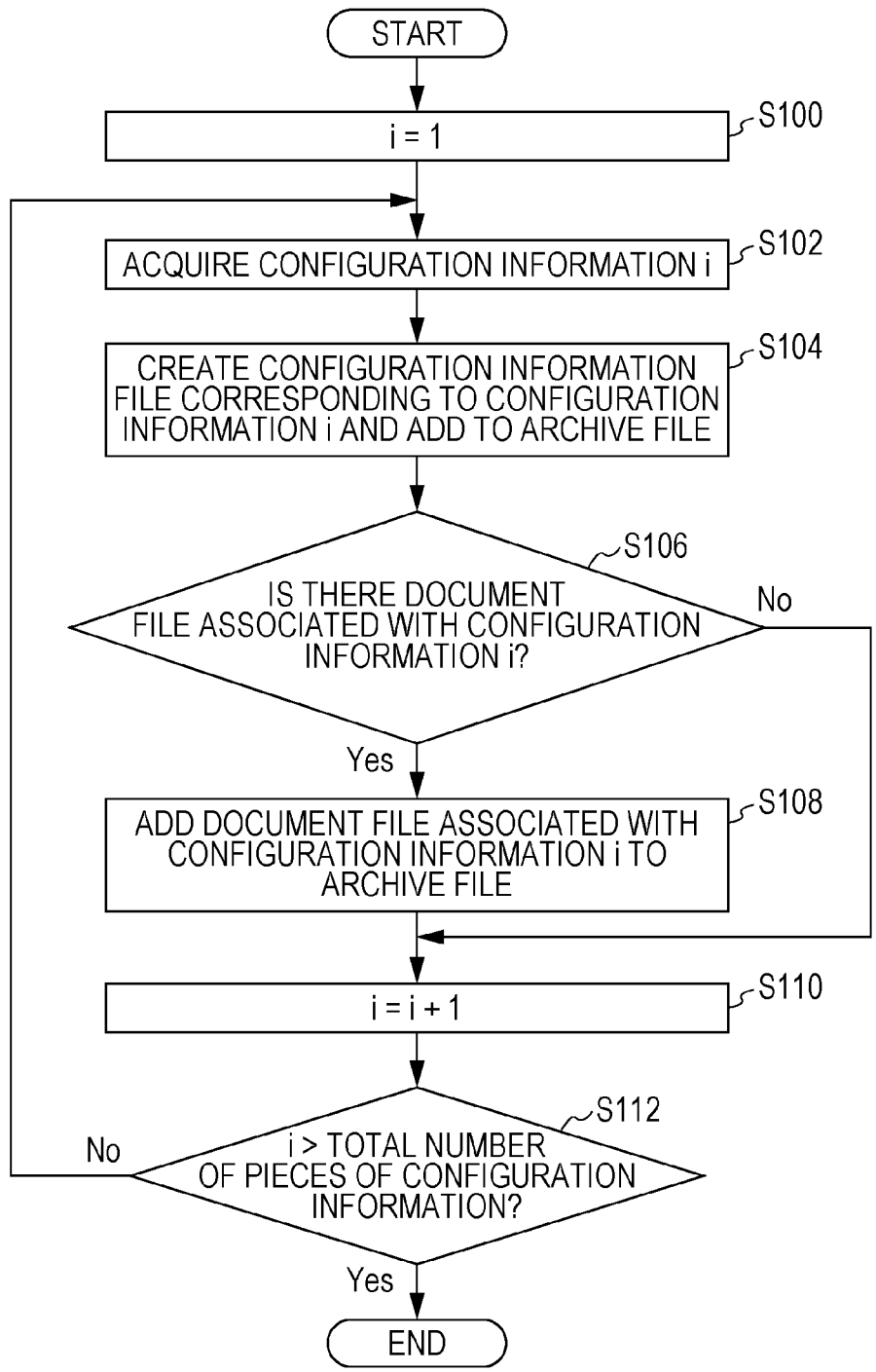
FIG. 5 is a flowchart depicting a flow of a process of creating an archive file.

After accepting the collective-retrieval request from the client 14, the processor 20 of the file management apparatus 12 functions as the archive creator 32 and creates an archive file. FIG. 5 is a flowchart depicting a flow of a process of creating an archive file. FIG. 6 depicts an example of an archive file 70, which is created by the process in FIG. 5 for the same configuration information 40 in the document DB 38 as is depicted as the document-file management example 26 in FIG. 2.

Referring to the document-file management example 26 in FIG. 2, the flowchart in FIG. 5 will be described. The configuration information for the document-file management example 26 in FIG. 2 includes the following 6 pieces of configuration information, "Task 1-Plan", "Task 1-Report", "Task 2-Plan", "Task 2-Report", "Task 3-Plan", and "Task 3-Report".

In step S100 in FIG. 5, the archive creator 32 sets a variable i at 1. Next, in step S102, the archive creator 32 acquires the i-th piece of configuration information (configuration information i) in the configuration information 40 in the document DB 38. Since i=1 at this time, "Task 1-Plan" in FIG. 2 is acquired as the first piece of configuration information.

Next, in step S104, the archive creator 32 creates as a file in an archive file a configuration information file corresponding to the i-th piece of configuration information (configuration information i). Hereinafter, this configuration information file is referred to as the i-th configuration information file. The corresponding piece of configuration information is added to the filename of the configuration information file at this time. Since i=1 at this time, the first configuration information file is created. FIG. 6 depicts the first configuration information file 72, which is named "001_Task 1_Plan.txt". The first piece of configuration information "Task 1-Plan" is added to the filename. The number "001" included in the filename is a serial number consecutively attached to a file in the archive file. A serial number may be omitted as appropriate.

The content of (what is contained in) the configuration information file 72 is not limited. For example, a configuration information file may contain nothing. In the present exemplary embodiment, the content of a configuration information file includes information for accessing the file management apparatus 12 (refer to content 73 of a configuration information file in FIG. 7). The format of the configuration information file 72 is not limited either, and a text format is adopted in the present exemplary embodiment.

Next, in step S106, the archive creator 32 checks whether a document file associated with the i-th piece of configuration information (configuration information i) has been registered in the document DB 38. Since i=1 at this time, a check is performed for the first piece of configuration information. Since the document file 28 "Plan 1.pdf", which is associated with the first piece of configuration information "Task 1-Plan", has already been registered in the document DB 38 for the document-file management example 26 in FIG. 2, the determination becomes affirmative in step S106, and the process proceeds to step S108.

Then, in step S108, the archive creator 32 retrieves a registered document file 48 associated with the i-th piece of configuration information (configuration information i) from the registered document-file group 46 in the document DB 38 and adds the registered document file 48 to the archive file 70. The corresponding piece of configuration information is added to the filename of the document file at this time. Since i=1 at this time, the first piece of configuration information is added. FIG. 6 depicts a document file 74 "002_Task 1_Plan_Plan 1.pdf", which is associated with the first piece of configuration information. This filename is formed by adding the first piece of configuration information "Task 1-Plan" to the original filename of the document file "Plan 1.pdf". This filename contains two underscores between the original filename "Plan 1.pdf" and the added portion "002_Task 1_Plan", which consists of a serial number and the configuration information, to distinguish between the original filename and the configuration information in the new filename.

If it is determined in step S106 that a document file associated with the i-th piece of configuration information (configuration information i) has not been registered in the document DB 38 (No in step S106), step S108 is skipped.

Then, in step S110, the archive creator 32 adds 1 to the variable i. At this time, adding 1 to the variable i=1 gives i=2. Next, in step S112, the archive creator 32 checks whether the variable i is larger than the total number of pieces of configuration information 40 in the document DB 38. Since the document-file management example 26 in FIG. 2 provides 6 pieces of configuration information in total and i=2 at this time, negative determination is made in step S112. If the determination in step S112 is negative, the process returns to step S102, and a next piece of configuration information is processed.

Since i=2 at this time, the archive creator 32 causes the second piece of configuration information to undergo the processing that is the same as the processing in steps S102 to S108 described above. Specifically, in step S102, the archive creator 32 acquires the second piece of configuration information "Task 1-Report" in FIG. 2, and performs the processing in steps S104 to S108, thereby adding to the archive file 70 the configuration information file 72 "003_Task 1_Report.txt", which corresponds to the second piece of configuration information, and the document file 74 "004_Task 1_Report_Report 1.pdf".

The variable i is increased in this way until all the pieces of configuration information are processed, and then affirmative determination is made in step S112, leading to the completion of the flow in FIG. 5. The document-file management example 26 in FIG. 2 contains the first to third pieces of configuration information, with which document files are associated. Thus, the archive file 70 in FIG. 6 contains those document files, which have modified filenames. In contrast, the document-file management example 26 in FIG. 2 contains the fourth to sixth pieces of configuration information, with which no document file is associated. Thus, the archive file 70 in FIG. 6 contains no document file for the fourth to sixth pieces of configuration information.

The file management apparatus 12 sends the archive file 70, which has been created, to the client 14, which has sent the collective-retrieval request. The client 14, which has sent the collective-retrieval request, receives the archive file 70 from the file management apparatus 12 and stores the archive file 70 in a storage location in the memory device 52. The storage location has been specified in the storage-location specifying window 64 in FIG. 4.

Representative Examples of Operations and Effects

According to the exemplary embodiment described above, the user grasps by using the client 14 a position (piece of configuration information) with which a document file has not been associated, namely a position (piece of configuration information) at which a document file has not been registered in the document DB 38, based on the content of the archive file 70. Specifically, if there is a combination of a document file 74 and a configuration information file 72, both of which have filenames having the same piece of configuration information, the document file 74 has been registered and associated with the piece of configuration information. If there is no combination and only a configuration information file 72 is present, a document file has not been registered and has not been associated with the piece of configuration information corresponding to the configuration information file 72. Although the user can check such information in the management screen 58, it is a satisfactory feature to be able to determine whether a document has been registered based on the content of the archive file 70 without presenting the management screen 58 by accessing the file management apparatus 12 again after retrieving the archive file 70 and closing the management screen 58.

Further, according to the exemplary embodiment described above, since document files are placed at a single level of hierarchy, the user who has acquired the archive file 70 can more easily reach a target document file 74 than in the case where document files are placed in different folders. In addition, if a plurality of document files having the same filename, such as the document files "Plan 1.pdf" in FIG. 2, are registered and the plurality of document files are collectively retrieved without changing the filenames, the plurality of document files cannot generally be placed at a single level of hierarchy. However, according to the exemplary embodiment described above, if document files have the same filename, the positions (pieces of configuration information) of the document files are different, and thus adding a different piece of configuration information to each of the filenames of the document files enables the document files to be placed at a single level of hierarchy.

Content of Configuration Information File

Figure 7:
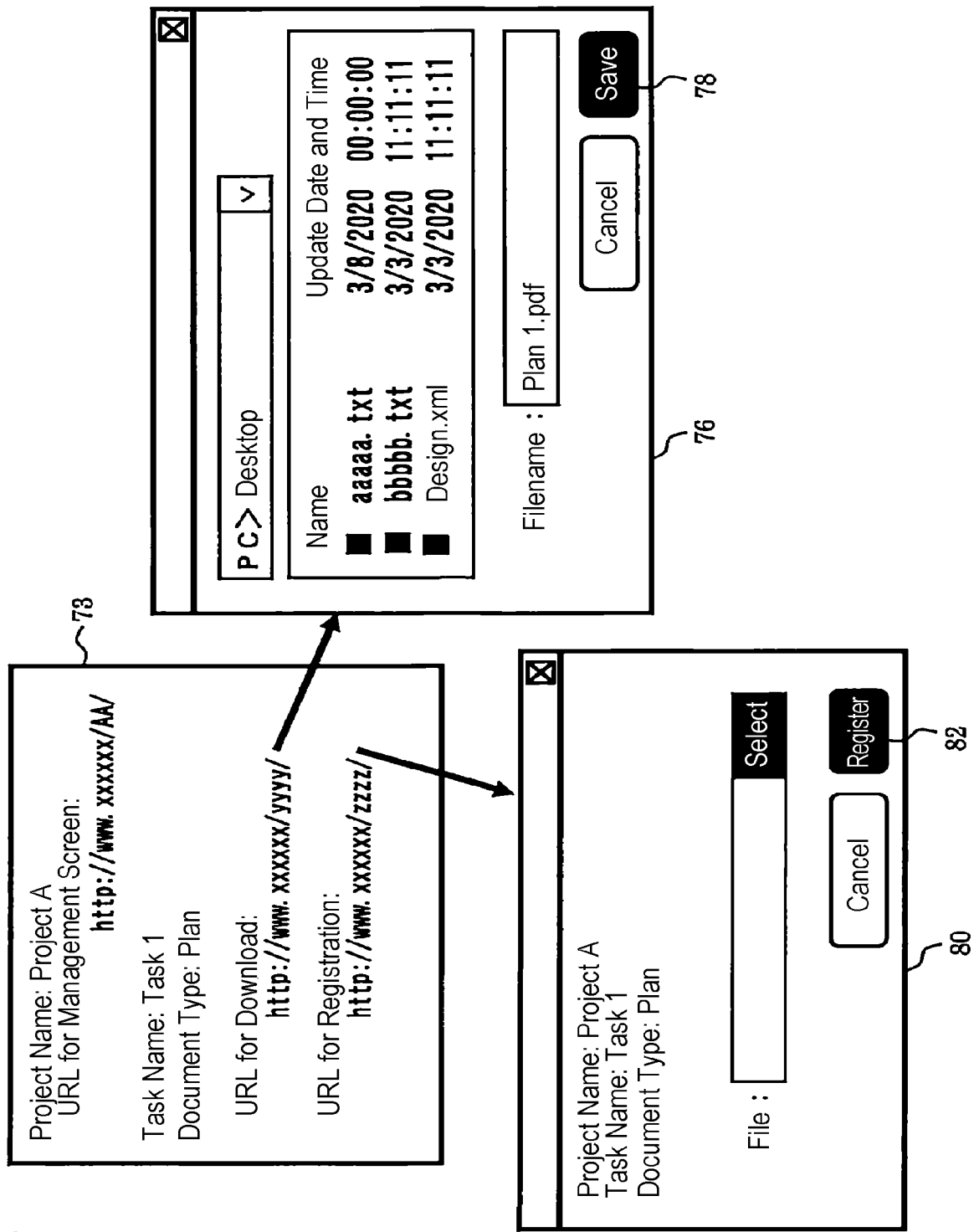
FIG. 7 is an illustration depicting the content of a configuration information file and example windows presented based on access information contained in the configuration information file.

Next, the content of (what is contained in) a configuration information file 72, which is stored in the archive file 70, will be described. FIG. 7 is an illustration depicting the content 73 of a configuration information file and example windows 76 and 80 presented based on access information contained as the content 73. The content 73 of the configuration information file in FIG. 7 depicts the content of the configuration information file 72 "001_Task 1_Plan.txt", which is depicted in FIG. 6.

As depicted in FIG. 7, the content 73 of the configuration information file includes information for accessing the file management apparatus 12. The information for accessing the file management apparatus 12 indicates an address with which to access a screen (page) or a folder that is provided by the file management apparatus 12. In the example in FIG. 7, the content 73 of the configuration information file includes a universal resource locator (URL) for the management screen, a URL for download, and a URL for registration. The URL for the management screen is access information for presenting the management screen 58 described above by using the display device 54 of the client 14. The user causes the display device 54 of the client 14 to present the management screen 58 by entering the URL for the management screen into an application such as a web browser of the client 14. In this way, since the content 73 of the configuration information file includes the information for accessing the management screen 58, the user can more easily cause the display device 54 of the client 14 to present the management screen 58 than by accessing the file management apparatus 12 and further providing an instruction to present the management screen 58.

The URL for download is access information for individually retrieving from the file management apparatus 12 and storing in the client 14 a document file corresponding to the configuration information file containing the URL for download. The URL for download is different for each configuration information file 72. The example in FIG. 7 depicts an access URL used to retrieve a document file ("Plan 1.pdf" at the top in FIG. 2) associated with the piece of configuration information "Task 1-Plan", which corresponds to the configuration information file "001_Task 1_Plan.txt". The user causes the display device 54 of the client 14 to present a storage-location specifying window 76 (refer to FIG. 7) by entering the URL for download into an application such as a web browser of the client 14. The user specifies in the storage-location specifying window 76 the storage location of the document file and the filename of the document file ("Plan 1.pdf" in the example in FIG. 7) and presses a "Save" button 78. This operation stores the document file, which has been registered in the document DB 38 and associated with the piece of configuration information "Task 1-Plan", in the storage location specified in the storage-location specifying window 76. At this time, the processor 20 of the file management apparatus 12 functions and performs processing as the retrieval processor 36. This access information is effective in that, for example, when a document file stored in the document DB 38 is updated, the document file can individually be retrieved. In addition, since the content 73 of the configuration information file includes information for accessing the source location of a document file, the user need not search for the source location of the document file in the file management apparatus 12.

The URL for registration is access information for specifying and registering in the document DB 38 a document file to be associated with a piece of configuration information corresponding to the configuration information file containing the URL for registration. The URL for registration is different for each configuration information file 72. The example in FIG. 7 depicts an access URL used to register and associate a document file with the piece of configuration information "Task 1-Plan". The user causes the display device 54 of the client 14 to present a file specifying window 80 (refer to FIG. 7) by entering the URL for registration into an application such as a web browser of the client 14. The user specifies in the file specifying window 80 a document file to be registered and presses a "Register" button 82. This operation registers the document file specified in the file specifying window 80 as the document file to be associated with the piece of configuration information "Task 1-Plan" in the document DB 38. At this time, the processor 20 of the file management apparatus 12 functions and performs processing as the registration processor 34. In this way, since the content 73 of the configuration information file includes information for accessing the registration location of a document file, the user need not search for the registration location of the document file in the file management apparatus 12.

Determining Sequence of Elements in Filename

Figure 8:
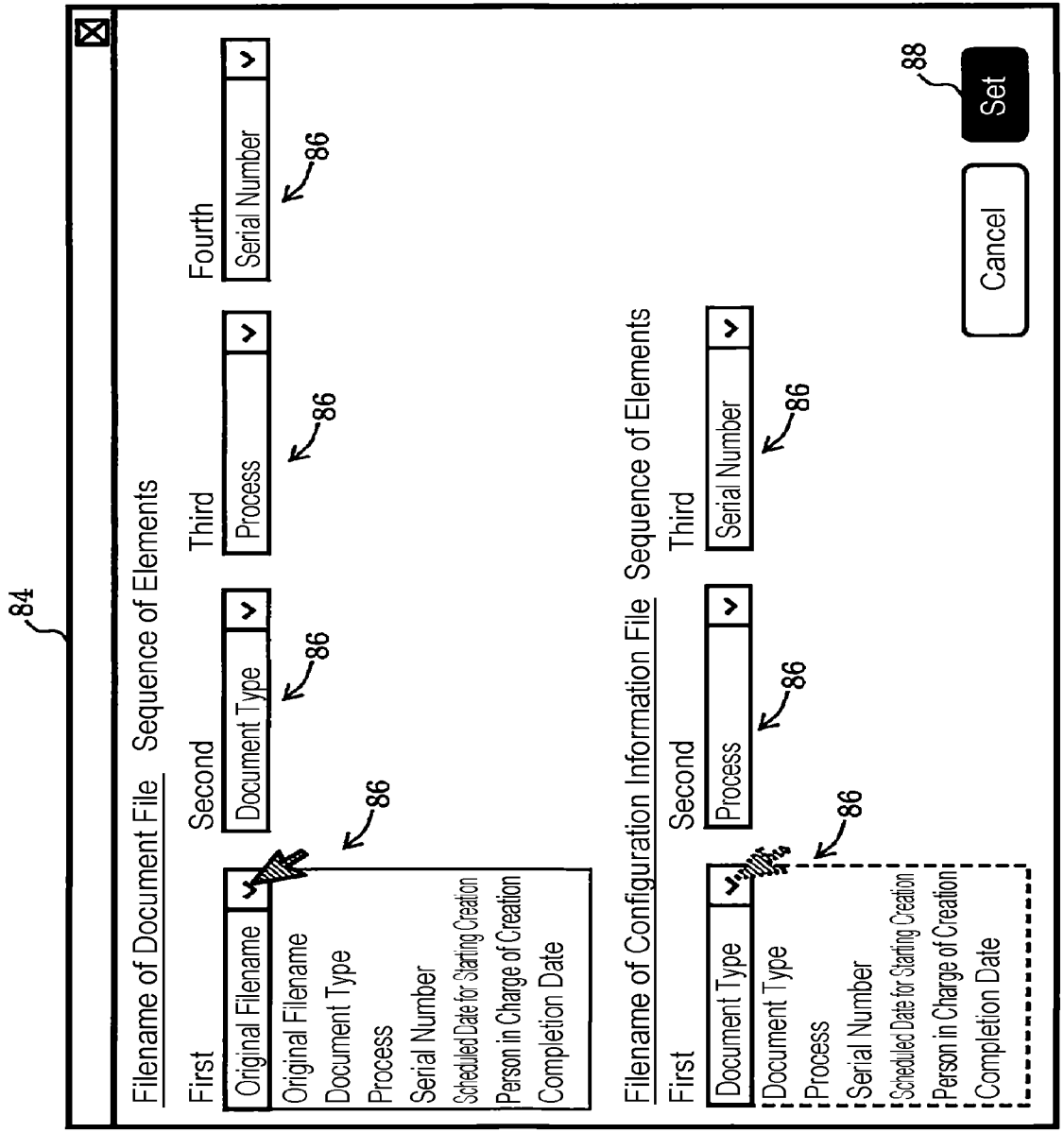
FIG. 8 is an illustration depicting an example screen in which sequences of elements contained in the filenames of a document file and a configuration information file are determined.

Next, how to determine a sequence of elements in a filename for the filenames of a document file 74 and a configuration information file 72 in an archive file 70 will be described. When collectively retrieving registered document files by using the archive file 70, the user presses a "Set Details" button 68 placed in the storage-location specifying window 64 in FIG. 4. This operation causes the display device 54 of the client 14 to present a setting screen with which to determine the sequence of elements in a filename. FIG. 8 depicts an example of a setting screen 84.

As depicted in FIG. 8, the setting screen 84 contains a plurality of pull-down menus 86 with which to specify elements in the filenames of a document file and a configuration information file in an archive file. The user specifies the first to fourth elements in the filename of the document file by using a set of pull-down menus 86 and the first to third elements in the filename of the configuration information file by using another set of pull-down menus 86. Although it is assumed that the filename of the document file has four elements and the filename of the configuration information file has three elements in this example, the number of elements may be changed as appropriate.

As depicted by a pull-down menu 86 that is extended in the upper part of FIG. 8, the types of elements that can be specified in the filename of a document file include the original filename of the document file, configuration elements in a piece of configuration information (a process and a document type), a serial number, and attribute information (a scheduled date for starting creation, a person in charge of creation, and a completion date). The user specifies and associates the attribute information with a piece of configuration information and stores the attribute information in the document DB 38 before registering a document file (the attribute information 42 in the document DB 38, which is depicted in FIG. 3). Further, as depicted by a pull-down menu 86 that is extended in the lower part of FIG. 8, the types of elements that can be specified in the filename of a configuration information file include configuration elements in a piece of configuration information (a process and a document type), a serial number, and attribute information (a scheduled date for starting creation, a person in charge of creation, and a completion date).

In the setting screen 84, the user specifies each element in the filenames of the document file and the configuration information file and presses a "Set" button 88, and the determination of the sequences is complete. Subsequently, the user presses the "Save" button 66 in the storage-location specifying window 64 in FIG. 4, and then the archive file 70 is stored in the memory device 52 of the client 14.

Figure 9:
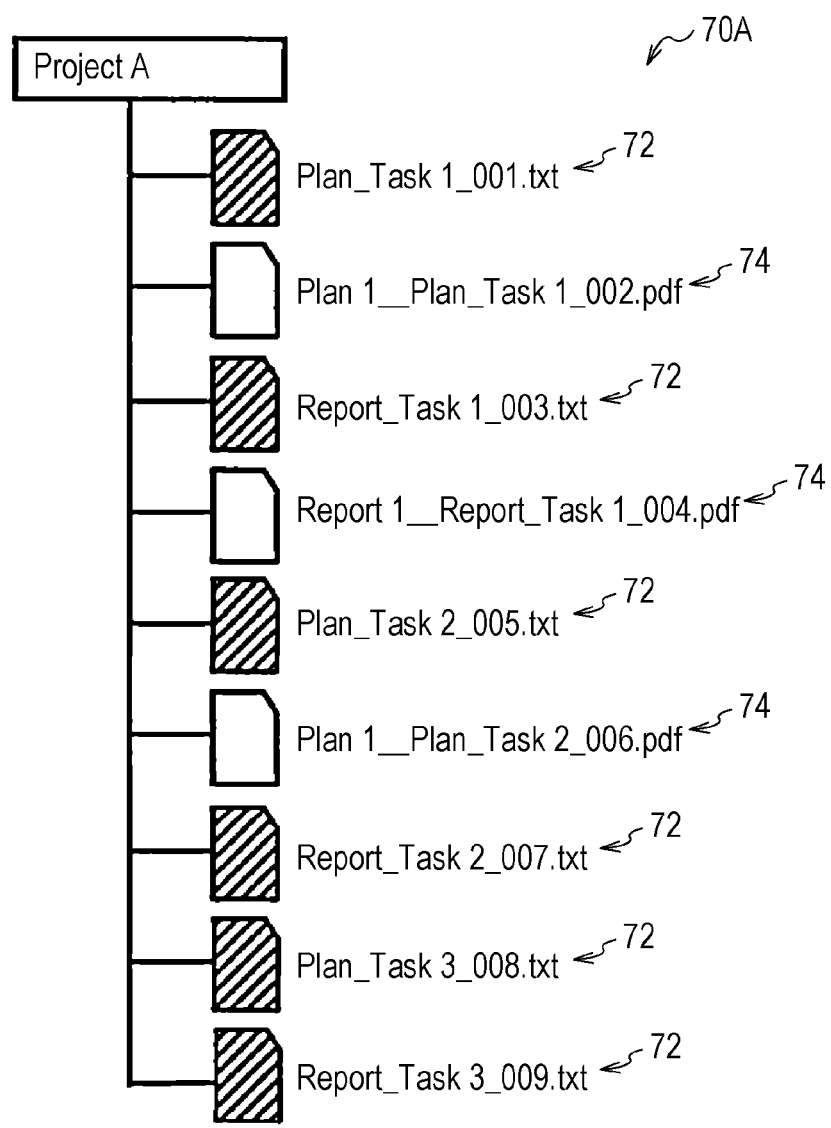
FIG. 9 is an illustration depicting an example configuration of an archive file formed based on the sequence specification depicted in FIG. 8.

FIG. 9 is an illustration depicting a configuration of an archive file 70A formed by using the elements specified by the sets of pull-down menus 86 in the setting screen 84 depicted in FIG. 8. Since the original filename is specified as the first element in the filename of the document file in FIG. 8, the original filename is placed in the leading part of the filename of each document file 74 in FIG. 9. In the exemplary embodiment according to the present disclosure, since a piece of configuration information is added to the filename of a document file, the filename may be very long. Some systems impose a limit on the number of characters in a filename, and the trailing part of a filename may be truncated. Adding the original filename to the leading part of a filename, as depicted in FIG. 9, avoids the omission of the original filename in such a case. In this way, a new filename having a requested sequence of the original filename and configuration elements is obtained for the document file. In addition, a filename having a requested sequence of configuration elements is obtained for the configuration information file.

Figure 10:
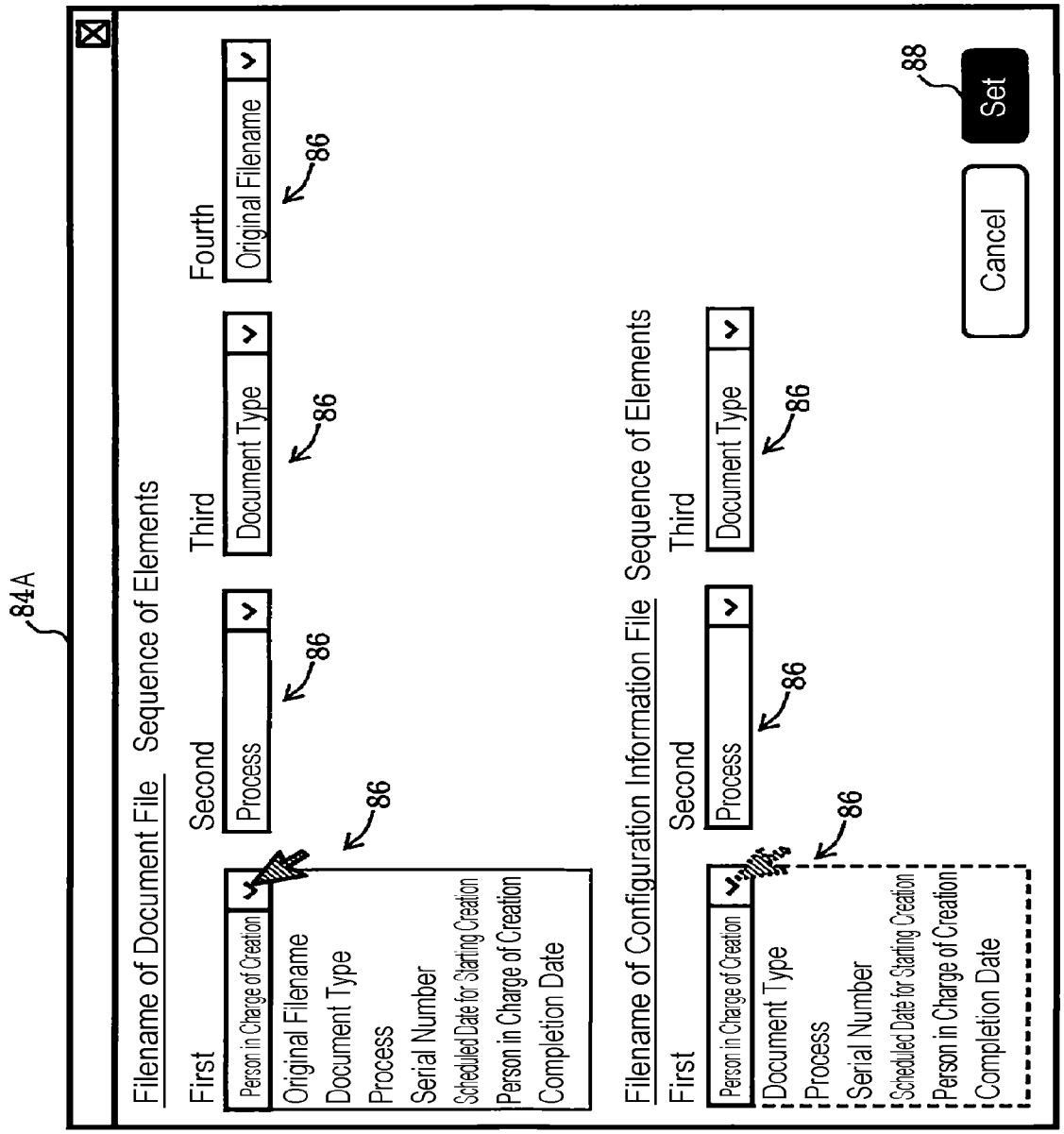
FIG. 10 is an illustration depicting another example screen in which sequences of elements contained in the filenames of a document file and a configuration information file are determined.
Figure 11:
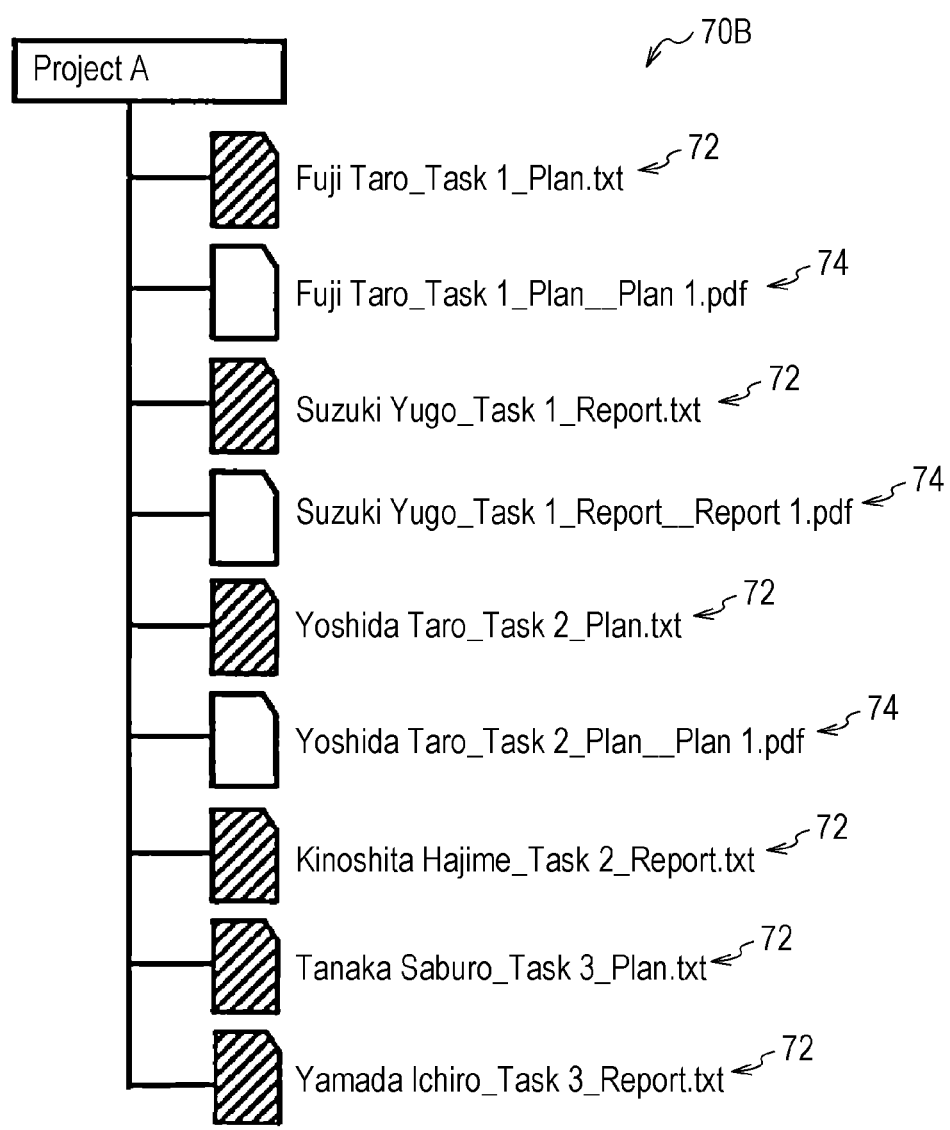
FIG. 11 is an illustration depicting an example configuration of an archive file formed based on the sequence specification depicted in FIG. 10.

FIG. 10 depicts a setting screen 84A similar to the setting screen 84 in FIG. 8, and the specification of element for each pull-down menu 86 is changed from the specification in the setting screen 84 in FIG. 8. In FIG. 10, a person in charge of creation, which is one piece of attribute information, is assigned to the first element in each of the filenames of a document file and a configuration information file. FIG. 11 is an illustration depicting a configuration of an archive file 70B formed by using the elements specified by the sets of pull-down menus 86 in the setting screen 84A depicted in FIG. 10. As depicted in FIG. 11, the filenames of the document files 74 and the configuration information files 72 each contain the name of a person in charge of creation. In this way, adding attribute information to the filename of a file enables the user to obtain from the filename the attribute information regarding the piece of configuration information with which the file is associated.

Figure 12:
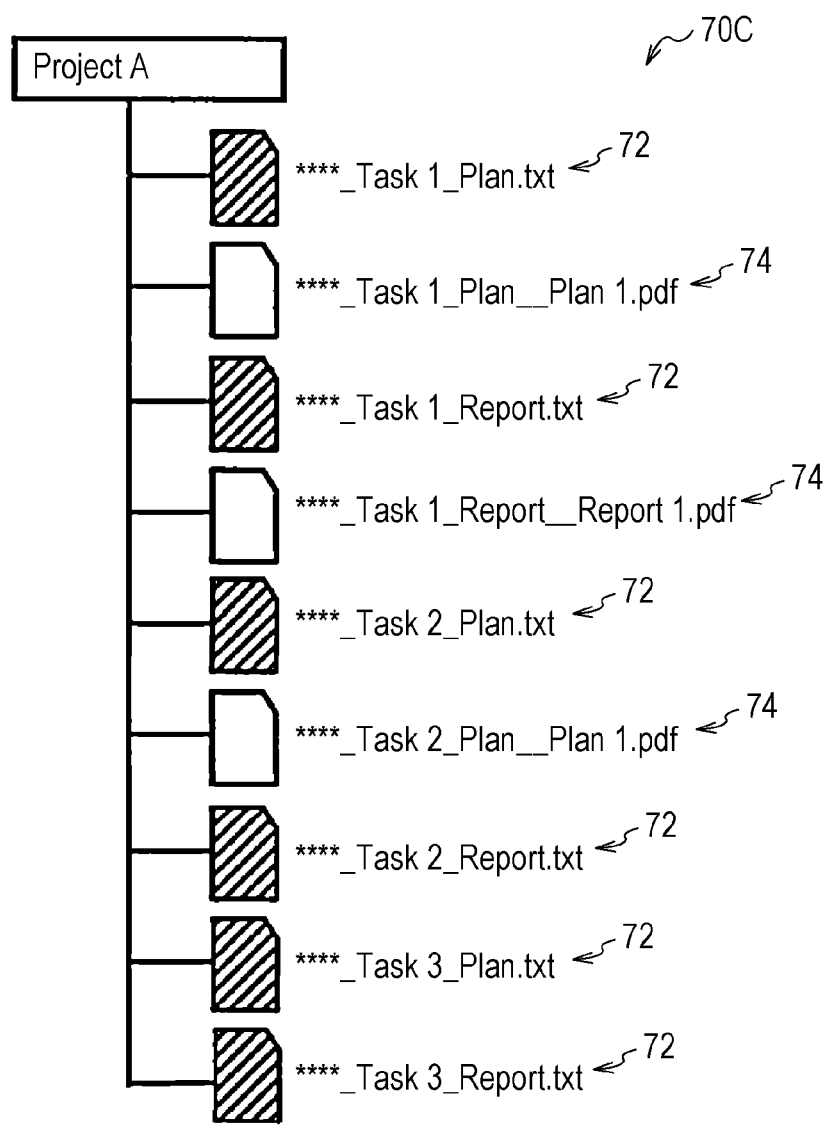
FIG. 12 is an illustration depicting another example configuration of an archive file formed based on the sequence specification depicted in FIG. 10.

In some cases, a portion or all of the attribute information 42 in the document DB 38 may be missing because the user fails to specify such information. For example, a person in charge of creation, which is described above, may be specified as an element in the filename of a document file or a configuration information file, as depicted by the setting screen 84A in FIG. 10, although a person in charge of creation is missing in the attribute information 42 in the document DB 38. When an archive file is created in such a case, a predetermined character string may be added to the filename of the configuration information file 72 or the document file 74 instead of missing attribute information (a person in charge of creation), as in an archive file 70C depicted in FIG. 12. In FIG. 12, a character string "****" is used as the predetermined character string. In this way, the filename of the document file 74 or the configuration information file 72 enables the user to know the fact that the specified attribute information regarding the piece of configuration information with which the document file 74 or the configuration information file 72 is associated is missing.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A file management apparatus comprising:
    a processor configured to:
    manage a plurality of content files for a specific purpose in a hierarchical file structure, each level of the hierarchical file structure having a location,
    register the plurality of content files into the hierarchical file structure,
    create a configuration information for each of the plurality of the content files and for each location of the hierarchical file structure in a way that each configuration information indicates a location of each of the plurality of the content files or of each location of the hierarchical file structure in response to the plurality of content files having been registered,
    accept a retrieval request for retrieving the plurality of content files, each of the plurality of content files is associated with a corresponding configuration information of the configuration information,
    create a configuration information file in response to the retrieval request for each of the configuration information, each of the configuration information having a filename based on a corresponding location in the hierarchical file structure as indicated by the corresponding configuration information of the configuration information file, wherein a configuration information file corresponding to a location in the hierarchical file structure has not yet been associated with any content file of the plurality of the content files,
    extend a filename for each of the plurality of the content files based on a corresponding location of each of the plurality of content files in the hierarchical file structure as indicated by the corresponding configuration information, and
    perform an archiving of the plurality of content files to create an archive file of the plurality of the content files, wherein
        the plurality of content files in the archive file is to be placed in a single level of hierarchy, and
        the configuration information file is included in the archive file.

2. The file management apparatus according to claim 1, wherein the configuration information file contains information for accessing the file management apparatus and the information is used by a user to store in the file management apparatus a content file of the plurality of the content files associated with the configuration information file.

3. The file management apparatus according to claim 1,
wherein the configuration information file contains information for accessing the file management apparatus and the information is used by a user to retrieve from the file management apparatus a content file of the plurality of the content files associated with the configuration information file.

4. The file management apparatus according to claim 2,
wherein the configuration information file contains information for accessing the file management apparatus and the information is used by a user to retrieve from the file management apparatus a content file of the plurality of the content files associated with the configuration information file.

5. The file management apparatus according to claim 1,
wherein the configuration information file contains information for accessing the file management apparatus and the information is used by a user to present a management screen for the plurality of content files for the specific purpose.

6. The file management apparatus according to claim 2,
wherein the configuration information file contains information for accessing the file management apparatus and the information is used by a user to present a management screen for the plurality of content files for the specific purpose.

7. The file management apparatus according to claim 3,
wherein the configuration information file contains information for accessing the file management apparatus and the information is used by a user to present a management screen for the plurality of content files for the specific purpose.

8. The file management apparatus according to claim 4,
wherein the configuration information file contains information for accessing the file management apparatus and the information is used by a user to present a management screen for the plurality of content files for the specific purpose.

9. The file management apparatus according to claim 1,
wherein the configuration information for each of the plurality of the content files each include a plurality of configuration elements, and
the processor is configured to:
in a case where, in response to the retrieval request, a new filename is formed by addition of a piece of the configuration information to an original filename of a registered content file that has been associated with the configuration information, accept determination of a sequence of the original filename and the plurality of configuration elements in the new filename.

10. The file management apparatus according to claim 1,
wherein the pieces of configuration information for each of the plurality of the content files each include a plurality of configuration elements, and
the processor is configured to:
in a case where, in response to the retrieval request, a piece of the configuration information is added to a filename of a configuration information file created for the configuration information, accept determination of a sequence of the plurality of configuration elements in the filename.

11. The file management apparatus according to claim 9,
wherein the pieces of configuration information for each of the plurality of the content each include a plurality of configuration elements, and
the processor is configured to:
in a case where, in response to the retrieval request, a piece of the configuration information is added to a filename of a configuration information file created for the configuration information, accept determination of a sequence of the plurality of configuration elements in the filename.

12. The file management apparatus according to claim 1,
wherein the processor is configured to:
in a case where the configuration information file is created in response to the retrieval request, add, to the filename of the configuration information file, attribute information regarding a piece of the configuration information for which the configuration information file is created.

13. The file management apparatus according to claim 9,
wherein the processor is configured to:
in a case where the configuration information file is created in response to the retrieval request, add, to the filename of the configuration information file, attribute information regarding a piece of the configuration information for which the configuration information file is created.

14. The file management apparatus according to claim 10,
wherein the processor is configured to:
in a case where the configuration information file is created in response to the retrieval request, add, to the filename of the configuration information file, attribute information regarding a piece of the configuration information for which the configuration information file is created.

15. The file management apparatus according to claim 11,
wherein the processor is configured to:
in a case where the configuration information file is created in response to the retrieval request, add, to the filename of the configuration information file, attribute information regarding a piece of the configuration information for which the configuration information file is created.

16. The file management apparatus according to claim 12,
wherein the processor is configured to:
accept specification of a type of the attribute information to be added to the filename of the configuration information file.

17. The file management apparatus according to claim 13,
wherein the processor is configured to:
accept specification of a type of the attribute information to be added to the filename of the configuration information file.

18. The file management apparatus according to claim 14,
wherein the processor is configured to:
accept specification of a type of the attribute information to be added to the filename of the configuration information file.

19. The file management apparatus according to claim 16,
wherein the processor is configured to:
in a case where the specification of the type of the attribute information to be added to the filename of the configuration information file is accepted and the specified type of attribute information is missing, add a predetermined character string to the filename of the configuration information file instead of the specified type of attribute information.

20. A non-transitory computer readable medium storing a program causing a file management apparatus having a processor to execute a process for file management, the process executed by the processor comprising:

managing a plurality of content files for a specific purpose in a hierarchical file structure, each level of the hierarchical file structure having a location, registering the plurality of content files into the hierarchical file structure, creating a configuration information for each of the plurality of the content files and for each location of the hierarchical file structure in a way that each configuration information indicates a location of each of the plurality of the content files or of each location of the hierarchical file structure in response to the plurality of content files having been registered, accepting a retrieval request for retrieving the plurality of content files, each of the plurality of content files is associated with a corresponding configuration information of the configuration information, creating a configuration information file in response to the retrieval request for each of the configuration information, each of the configuration information having a filename based on a corresponding location in the hierarchical file structure as indicated by the corresponding configuration information of the configuration information file, wherein a configuration information file corresponding to a location in the hierarchical file structure has not yet been associated with any content file of the plurality of the content files, extending a filename for each of the plurality of the content files based on a corresponding location of each of the plurality of content files in the hierarchical file structure as indicated by the corresponding configuration information, and performing an archiving of the plurality of content files to create an archive file of the plurality of the content files, wherein the plurality of content files in the archive file is to be placed in a single level of hierarchy, and the configuration information file is included in the archive file.

* * * * *